United States Patent
Nowaczyk et al.

(10) Patent No.: US 8,511,447 B2
(45) Date of Patent: Aug. 20, 2013

(54) TRIPLE TUBE SHOCK ABSORBER HAVING A SHORTENED INTERMEDIATE TUBE

(75) Inventors: Mark Nowaczyk, Genk (BE); Johan Paesmans, Hasselt (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 847 days.

(21) Appl. No.: 12/366,106

(22) Filed: Feb. 5, 2009

(65) Prior Publication Data
US 2010/0193308 A1 Aug. 5, 2010

(51) Int. Cl.
*F16F 9/00* (2006.01)

(52) U.S. Cl.
USPC .......... 188/315; 188/322.2; 188/322.14; 188/266.6

(58) Field of Classification Search
USPC .......... 188/266.6, 322.13, 322.14, 322.19, 188/322.2, 314, 315
See application file for complete search history.

(56) References Cited

U.S. PATENT DOCUMENTS

| | | | |
|---|---|---|---|
| 4,923,038 A | | 5/1990 | Lizell |
| 5,024,460 A * | | 6/1991 | Hanson et al. ............. 280/5.519 |
| 5,163,538 A * | | 11/1992 | Derr et al. .................... 188/318 |
| 5,163,706 A | | 11/1992 | Maguran, Jr. et al. |
| 5,195,619 A * | | 3/1993 | Dourson et al. ........... 188/282.4 |
| 5,282,645 A * | | 2/1994 | Spakowski et al. ........ 188/266.6 |
| 5,477,949 A * | | 12/1995 | Forster et al. ............ 188/322.17 |
| 5,730,261 A * | | 3/1998 | Spakowski et al. ........ 188/266.6 |
| 5,901,820 A | | 5/1999 | Kashiwagi et al. |
| 5,924,528 A | | 7/1999 | Vermolen et al. |
| 6,155,391 A | | 12/2000 | Kashiwagi et al. |
| 6,283,259 B1 * | | 9/2001 | Nakadate .................... 188/322.2 |
| 6,527,093 B2 * | | 3/2003 | Oliver et al. ............... 188/322.2 |
| 8,307,965 B2 * | | 11/2012 | Foster et al. ................. 188/318 |
| 2005/0056504 A1 | | 3/2005 | Holiviers |
| 2005/0173214 A1 | | 8/2005 | Lemmens et al. |
| 2007/0000743 A1 * | | 1/2007 | Naitou et al. .............. 188/322.2 |
| 2007/0084687 A1 * | | 4/2007 | Foster et al. ............... 188/322.2 |
| 2013/0081913 A1 * | | 4/2013 | Nowaczyk et al. ........... 188/315 |

FOREIGN PATENT DOCUMENTS

JP 02-236035 9/1990

OTHER PUBLICATIONS

Search Report and Written Opinion dated Jun. 15, 2010 in corresponding PCT Application No. PCT/US2010/022054.

* cited by examiner

*Primary Examiner* — Thomas Irvin
(74) *Attorney, Agent, or Firm* — Harness, Dickey & Pierce, P.L.C.

(57) ABSTRACT

A triple tube shock absorber includes a pressure tube, a reserve tube and an intermediate tube. The intermediate tube is disposed between the pressure tube and the intermediate tube. A tube ring is disposed between the pressure tube and the intermediate tube to isolate an intermediate chamber from a reserve chamber. The intermediate tube ends at a position spaced from a base valve assembly to allow for the reduction of diameter of the reserve tube without adversely affecting fluid flow.

14 Claims, 4 Drawing Sheets

TRIPLE TUBE SHOCK ABSORBER HAVING A SHORTENED INTERMEDIATE TUBE

FIELD

The present disclosure relates to a hydraulic damper or shock absorber adapted for use in a suspension system such as the suspension systems used for automotive vehicles. More particularly, the present disclosure relates to a hydraulic damper or shock absorber having an intermediate tube disposed between the pressure tube and the reserve tube. The intermediate tube is shorter than the pressure tube to allow for a reduction of diameter of the reserve tube without adversely affecting fluid flow.

BACKGROUND

The statements in this section merely provide background information related to the present disclosure and may not constitute prior art.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is typically incorporated within the piston functions during the shock absorber's extension stroke of the piston with respect to the cylinder to create a damping load. A second valving system typically incorporated within the piston in a mono-tube design and in the base valve assembly in a dual-tube design functions during the shock absorber's compression stroke of the piston with respect to the cylinder to create a damping load.

Various types of adjustment mechanisms have been developed to generate damping forces in relation to the speed and/or amplitude of the displacement of the sprung or unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations from the unsprung mass while still providing the necessary damping or firm ride for the suspension system during vehicle maneuvers causing low frequency/large excitations of the sprung mass. Often, these damping characteristics are controlled by an externally mounted control valve. An externally mounted control valve is advantageous in that it may be easily removed for service or replacement.

SUMMARY

A shock absorber according to the present disclosure includes a pressure tube defining a working chamber. A piston is slidably disposed on the pressure tube within the working chamber and the piston divides the working chamber into an upper working chamber and a lower working chamber. A reserve tube surrounds the pressure tube to define a reserve chamber. An intermediate tube is disposed between the reserve tube and the pressure tube to define an intermediate chamber. An external control valve is secured to the reserve tube and the intermediate tube. An inlet to the control valve is in communication with the intermediate chamber and an outlet of the control valve is in communication with the reserve chamber. The control valve generates different pressure flow characteristics for the damper or shock absorber which control the damping characteristics for the damper or shock absorber. The different pressure-flow characteristics are a function of the current supplied to the control valve.

The intermediate tube is designed to be shorter than the pressure tube which enables the reserve tube to have a reduced diameter for packaging issues such as mating with a knuckle or another component of the suspension system. A ring is attached to the pressure tube which adapts the pressure tube to accept the shortened intermediate tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
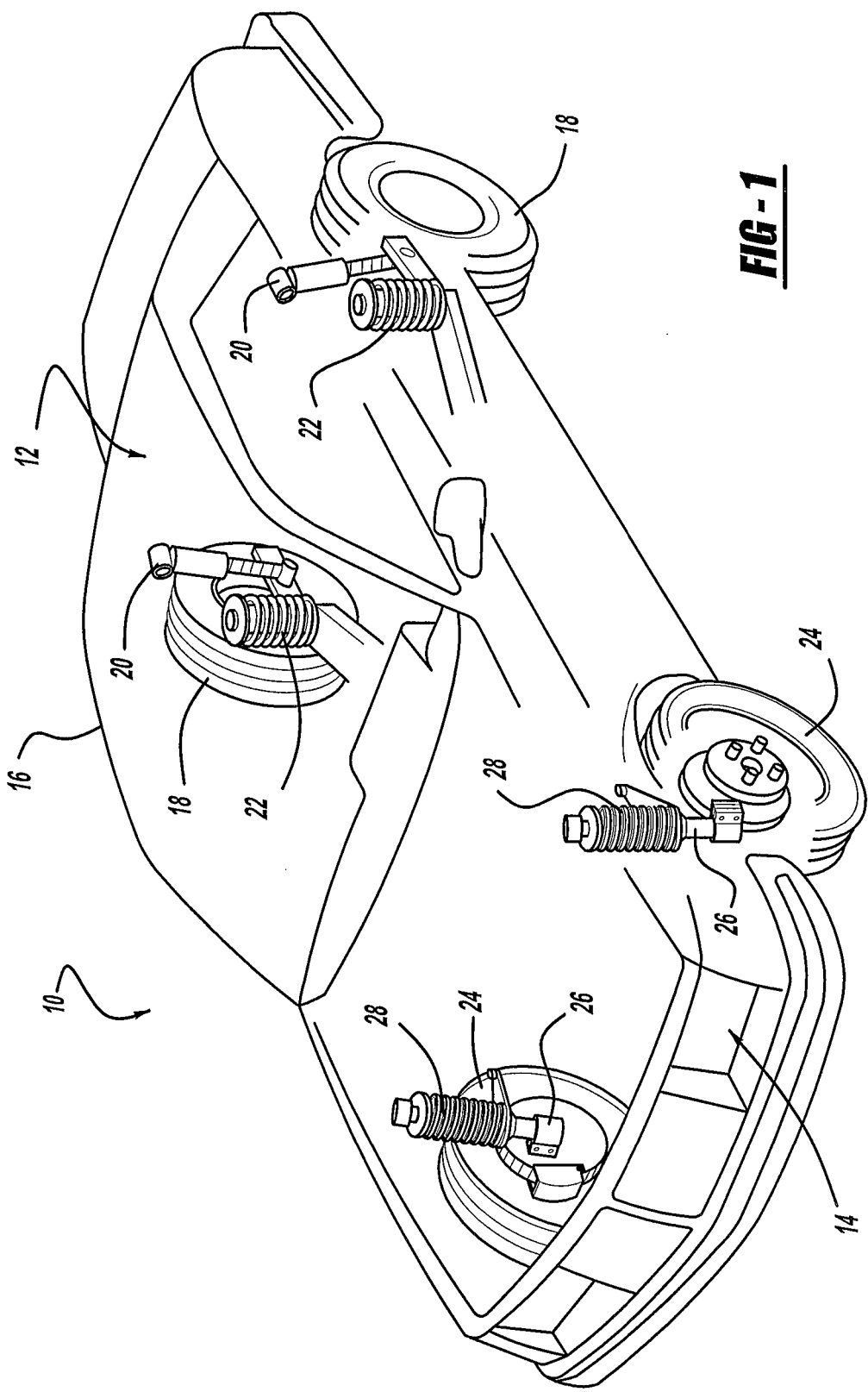
FIG. 1 illustrates an automotive vehicle which incorporates shock absorbers in accordance with the present disclosure.

The following description is merely exemplary in nature and is not intended to limit the present disclosure, application, or uses. Referring now to the drawings in which like reference numerals designate like components throughout the several views, there is shown in FIG. 1 a vehicle incorporating a suspension system having shock absorbers in accordance with the present disclosure, and which is designated by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
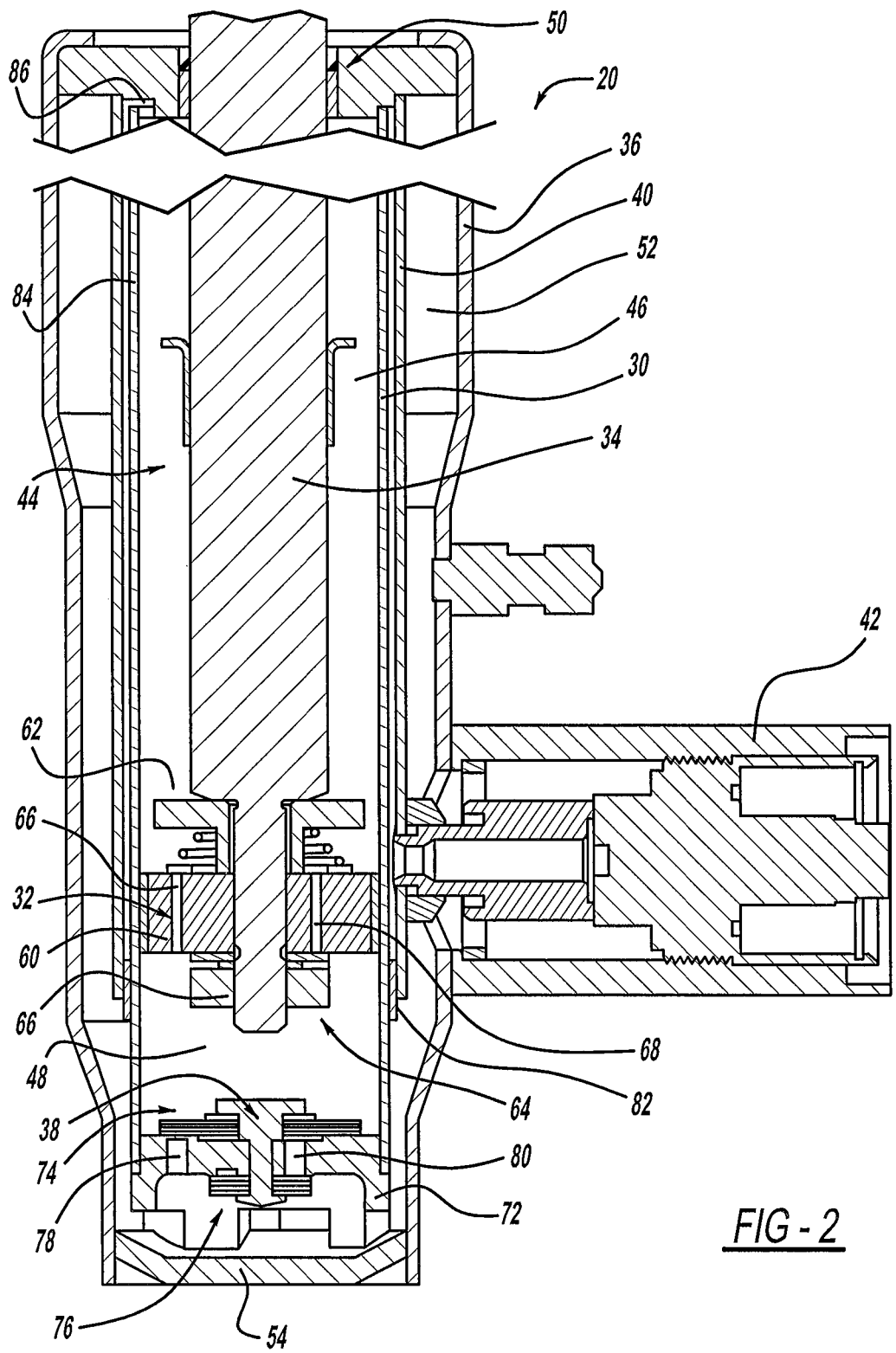
FIG. 2 is a cross-sectional side view of one of the shock absorbers illustrated in FIG. 1.

Referring now to FIG. 2, shock absorber 20 is shown in greater detail. While FIG. 2 illustrates only shock absorber 20, it is to be understood that shock absorber 26 also includes the control valve design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, an intermediate tube 40 and an externally mounted control valve 42.

Pressure tube 30 defines a working chamber 44. Piston assembly 32 is slidably disposed within pressure tube 30 and divides working chamber 44 into an upper working chamber 46 and a lower working chamber 48. A seal is disposed between piston assembly 32 and pressure tube 30 to permit sliding movement of piston assembly 32 with respect to pressure tube 30 without generating undue frictional forces as well as sealing upper working chamber 46 from lower working chamber 48. Piston rod 34 is attached to piston assembly 32 and extends through upper working chamber 46 and through an upper rod guide assembly 50 which closes the upper end of pressure tube 30. A sealing system seals the interface between upper rod guide assembly 50, reserve tube 36 and piston rod 34. The end of piston rod 34 opposite to piston assembly 32 is adapted to be secured to the sprung mass of vehicle 10. Because piston rod 34 extends only through upper working chamber 46 and not lower working chamber 48, extension and compression movements of piston assembly 32 with respect to pressure tube 30 causes a difference in the amount of fluid displaced in upper working chamber 46 and the amount of fluid displaced in lower working chamber 48. The difference in the amount of fluid displaced is known as the "rod volume" and during extension movements it flows through base valve assembly 38. During a compression movement of piston assembly 32 with respect to pressure tube 30, valving within piston assembly 32 allow fluid flow from lower working chamber 48 to upper working chamber 46 and the "rod volume" of fluid flow flows through control valve 42 as described below.

Reserve tube 36 surrounds pressure tube 30 to define a fluid reserve chamber 52 located between tubes 30 and 36. The bottom end of reserve tube 36 is closed by a base cup 54 which, with the lower portion of shock absorber 20, is adapted to be connected to the unsprung mass of vehicle 10. The upper end of reserve tube 36 is attached to upper rod guide assembly 50. Base valve assembly 38 is disposed between lower working chamber 48 and reserve chamber 52 to control the flow of fluid from reserve chamber 52 to lower working chamber 48. When shock absorber 20 extends in length, an additional volume of fluid is needed in lower working chamber 48 due to the "rod volume" concept. Thus, fluid will flow from reserve chamber 52 to lower working chamber 48 through base valve assembly 38 as detailed below. When shock absorber 20 compresses in length, an excess of fluid must be removed from lower working chamber 48 due to the "rod volume" concept. Thus, fluid will flow from lower working chamber 48 to reserve chamber 52 through control valve 42 as detailed below.

Piston assembly 32 comprises a piston body 60, a compression valve assembly 62 and an extension valve assembly 64. A nut 66 is assembled to piston rod 34 to secure compression valve assembly 62, piston body 60 and extension valve assembly 64 to piston rod 34. Piston body 60 defines a plurality of compression passages 68 and a plurality of extension passages 70. Base valve assembly 38 comprises a valve body 72, an extension valve assembly 74 and a compression valve assembly 76. Valve body 72 defines a plurality of extension passages 78 and a plurality of compression passages 80.

During a compression stroke, fluid in lower working chamber 48 is pressurized causing fluid pressure to react against compression valve assembly 62. Compression valve assembly 62 acts as a check valve between lower working chamber 48 and upper working chamber 46. The damping characteristics for shock absorber 20 during a compression stroke are controlled by control valve 42 alone and possibly by control valve 42 working in parallel with base valve assembly 38 as described below. Control valve 42 controls the flow of fluid from lower working chamber 48 to upper working chamber 46 through control valve 42 to reserve chamber 52 due to the "rod volume" concept during a compression stroke as discussed below. Compression valve assembly 76 controls the flow of fluid from lower working chamber 48 to reserve chamber 52 through compression passages 80 during a compression stroke. Compression valve assembly 76 can be designed as a safety hydraulic relief valve, a damping valve working in parallel with control valve 42 or compression valve assembly can be removed from base valve assembly 38. During an extension stroke, compression passages 68 are closed by compression valve assembly 62.

During an extension stroke, fluid in upper working chamber 46 is pressurized causing fluid pressure to react against extension valve assembly 64. Extension valve assembly 64 is designed as either a safety hydraulic relief valve which will open when the fluid pressure within upper working chamber 46 exceeds a predetermined limit or as a typical pressure valve working in parallel with control valve 42 to change the shape of the damping curve as discussed below. The damping characteristics for shock absorber 20 during an extension stroke are controlled by control valve 42 alone or by control valve 42 in parallel with extension valve assembly 64 as discussed below. Control valve 42 controls the flow of fluid from upper working chamber 46 to reserve chamber 52 through control valve 42. Replacement flow of fluid into lower working chamber 48 during an extension stroke flows through base valve assembly 38. Fluid in lower working chamber 48 is reduced in pressure causing fluid pressure in reserve chamber 52 to open extension valve assembly 74 and allow fluid flow from reserve chamber 52 to lower working chamber 48 through extension passages 78. Extension valve assembly 74 acts as a check valve between reserve chamber 52 and lower working chamber 48. The damping characteristics for shock absorber 20 during an extension stroke are controlled by control valve 42 alone and possibly by extension valve assembly 64 working in parallel with control valve 42 as described below.

Intermediate tube 40 engages upper rod guide assembly 50 on an upper end and it engages a third tube ring 82 attached to pressure tube 30 at its opposite end. An intermediate chamber 84 is defined between intermediate tube 40 and pressure tube 30. A passage 86 is formed in upper rod guide assembly 50 for fluidly connecting upper working chamber 46 and intermediate chamber 84.

Figure 3:
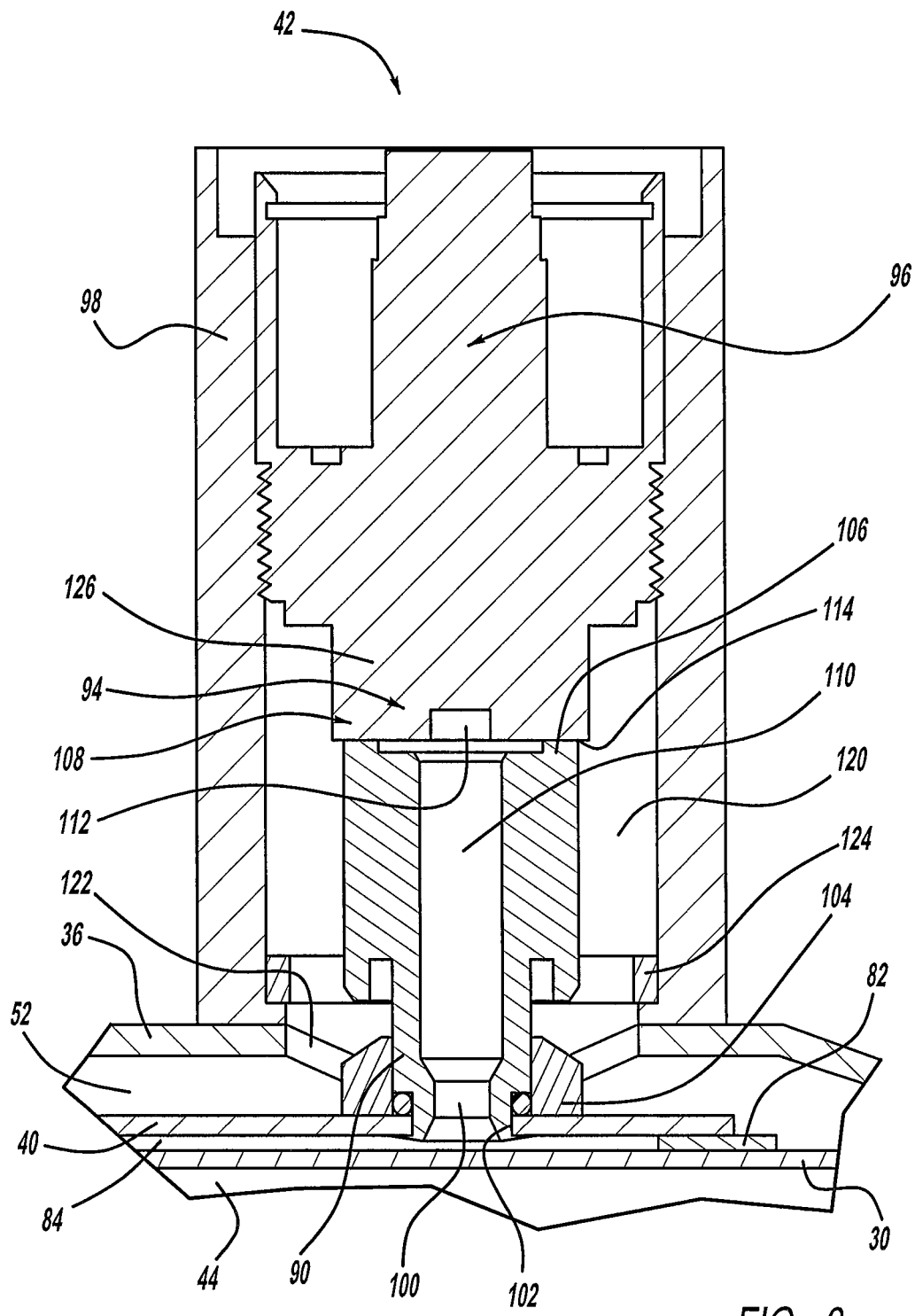
FIG. 3 is an enlarged cross-sectional side view of the lower end of the shock absorber illustrated in FIG. 2.

Referring to FIG. 3, control valve 42 is illustrated in greater detail. Control valve 42 comprises an attachment fitting 90, a valve assembly 94, a solenoid valve assembly 96 and an outer housing 98. Attachment fitting 90 defines an inlet passage 100 aligned with a fluid passage 102 which extends through intermediate tube 40 for fluid communication between intermediate chamber 84 and control valve 42. Attachment fitting 90 is axially received within a collar 104 mounted on intermediate tube 40. An O-ring seals the interface between attachment fitting 90 and collar 104. Collar 104 is preferably a distinct piece from intermediate tube 40 and it is mounted onto intermediate tube 40 by welding or by any other means known in the art.

Attachment fitting 90, valve assembly 94, and solenoid valve assembly 96 are all disposed within outer housing 98 and outer housing 98 is attached to reserve tube 36 by welding or by any other means known in the art. Valve assembly 94 includes a valve seat 106 and solenoid valve assembly 96 includes a valve body assembly 108. Valve seat 106 defines an axial bore 110 which receives fluid from inlet passage 100. Valve body assembly 108 defines an axial bore 112. When valve body assembly is separated from valve seat 106, an annular radial flow passage 114 will communicate with a return flow passage 120 which is in communication with reserve chamber 52 through a fluid passage 122 formed through reserve tube 36. An attachment plate 124 is secured to outer housing 98 to position attachment fitting 90 and the rest of the components of control valve 42 within outer housing 98.

Referring to FIGS. 2 and 3, the operation of shock absorber 20 will be described when control valve 42 alone controls the damping loads for shock absorber 20. During a rebound or extension stroke, compression valve assembly 62 closes the plurality of compression passages 68 and fluid pressure within upper working chamber 46 increases. Fluid is forced from upper working chamber 46, through passage 86, into intermediate chamber 84, through fluid passage 102, through inlet passage 100 of attachment fitting 90, through axial bore 110, to reach valve assembly 94.

The higher flow damping characteristics of shock absorber 20 are determined by the configuration of valve assembly 94 and solenoid valve assembly 96. As such, valve assembly 94 and solenoid valve assembly 96 are configured to provide a predetermined damping function which is controlled by the signal provided to solenoid valve assembly 96. The predetermined damping function can be anywhere between a soft damping function to a firm damping function based upon the operating conditions of vehicle 10. At low piston velocities, control valve 42 remains closed and fluid flows through bleed passages that are made in piston assembly 32 and base valve assembly 38. Shock absorber 20 thus operates similar to a typical double tube damper. At higher piston velocities, as fluid flow increases, fluid pressure against a plunger 126 of valve body assembly 108 will separate plunger 126 of valve body assembly 108 from valve seat 106 and fluid will flow between plunger 126 of valve body assembly 108 and valve seat 106 through radial passages 114, through return flow passage 120, through fluid passage 122 and into reserve chamber 52. The fluid pressure required to separate plunger 126 of valve body assembly 108 from valve seat 106 will be determined by solenoid valve assembly 96. The rebound or extension movement of piston assembly 32 creates a low pressure within lower working chamber 48. Extension valve assembly 74 will open to allow fluid flow from reserve chamber 52 to lower working chamber 48.

During a compression stroke, compression valve assembly 62 will open to allow fluid flow from lower working chamber 48 to upper working chamber 46. Due to the "rod volume" concept, fluid in upper working chamber 46 will flow from upper working chamber 46, through passage 86, into intermediate chamber 84, through fluid passage 102, through inlet passage 100 of attachment fitting 90, through soft valve assembly 92 as discussed below, to reach valve assembly 94.

Similar to an extension or rebound stroke, the damping characteristics of shock absorber 20 are determined by the configuration of valve assembly 94 and solenoid valve assembly 96. As such, valve assembly 94 and solenoid valve assembly 96 are configured to provide a predetermined damping function which is controlled by the signal provided to solenoid valve assembly 96. The predetermined damping function can be anywhere between a soft damping function to a firm damping function based upon the operating conditions of vehicle 10. At low piston velocities, control valve 42 remains closed and fluid flows through the bleed passages that are made in piston assembly 32 and base valve assembly 38. Shock absorber 20 thus operates similar to a typical double tube damper at higher piston velocities, as fluid flow increases, fluid pressure against plunger 126 of valve body assembly 108 will separate plunger 126 of valve body assembly 108 from valve seat 106 and fluid will flow between plunger 126 of valve body assembly 108 and valve seat 106 through radial passages 114, through return flow passage 120, through fluid passage 122 and into reserve chamber 52. The fluid pressure required to separate plunger 126 of valve body assembly 108 from valve seat 106 will be determined by solenoid valve assembly 96. Thus, the damping characteristics for both an extension stroke and a compression stroke are controlled by control valve 42 in the same manner.

If only control valve 42 controls the damping loads for shock absorber 20, extension valve assembly 64 and compression valve assembly 76 are designed as hydraulic pressure relief valves or they are removed from the assembly. In order to tune or alter the damping curve at high current levels to solenoid valve assembly, extension valve assembly 64 and compression valve assembly 76 are designed as damping valves for opening at specific fluid pressures to contribute to the damping characteristics for shock absorber 20 in parallel with control valve 42.

Referring to FIG. 3, the attachment of intermediate tube 40 using third tube ring 82 is illustrated. It is only necessary for intermediate tube 40 to extend to attachment fitting 90 to allow inlet passage 100 to be in communication with intermediate chamber 84. Third tube ring 82 is disposed below attachment fitting 90 to place intermediate chamber 84 in communication with inlet passage 100. Third tube ring 82 also isolates intermediate chamber 84 from reserve chamber 52.

In some prior art designs including an intermediate tube, the intermediate tube extended all the way down to the base valve assembly. When shock absorbers are assembled into a knuckle of the suspension system, the knuckle is designed for a specific diameter of a reserve tube which is the reserve tube diameter for a dual tube shock absorber. When replacing a dual tube shock absorber with a triple tube shock absorber, it would be beneficial to have the same diameter of reserve tube but the triple tube design requires a larger diameter reserve tube to accommodate the intermediate tube. While it may be possible to locally reduce the diameter of the reserve tube at its lower end, the amount of reduction is limited because the hydraulic fluid flow from the reserve chamber to the base valve assembly would be blocked or severely restricted by the presence of the intermediate tube. The option of increasing the size of the mounting hole in the knuckle is usually not possible due to packaging considerations in the vehicle.

In the present disclosure, intermediate tube 40 extends only to a position past attachment fitting 90 and does not extend all the way to base valve assembly 38. This allows for a larger diameter reserve tube 36 to accommodate intermediate tube 40. In addition, the lower end of reserve tube 36 adjacent base valve assembly 38 can be locally reduced in diameter to a diameter similar to the diameter of a dual tube shock absorber reserve tube to adequately mate with the knuckle of the suspension system. This localized reduction of the diameter of reserve tube 36 permits the mating of reserve tube 36 with the knuckle without severely restricting the flow of fluid from reserve chamber 52 to base valve assembly 38.

Figure 4:
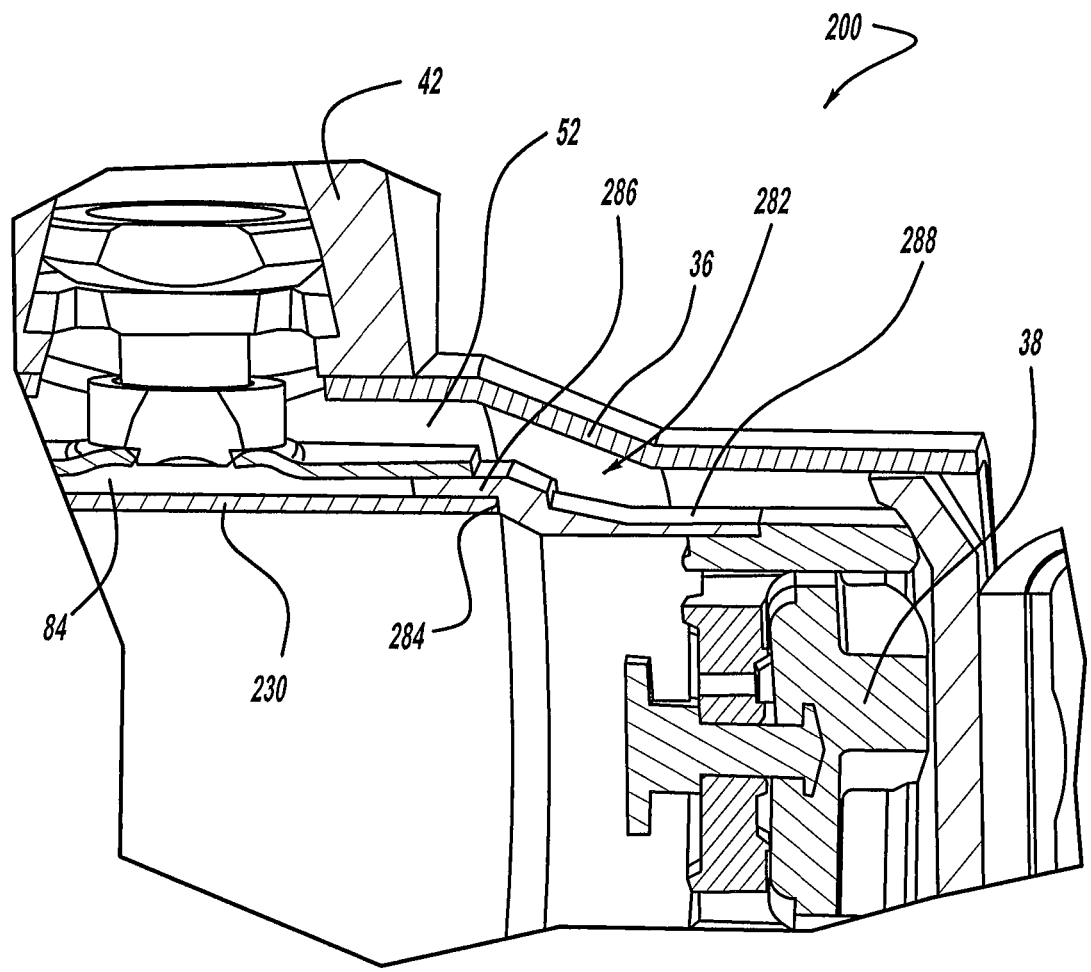
FIG. 4 is an enlarged cross-sectional side view of the lower end of a shock absorber in accordance with another embodiment of the disclosure.

Referring now to FIG. 4, the lower end of a shock absorber 200 is illustrated. Shock absorber 200 is the same as shock absorber 20, except that pressure tube 30 has been replaced by pressure tube 230 and third tube ring 82 has been replaced by third tube ring 282. Thus, the above discussion for shock absorber 20 and FIG. 2 apply to shock absorber 220, except for the interface between pressure tube 230 and base valve assembly 38 and third tube ring 282.

As illustrated in FIG. 4, third tube ring 282 extends from base valve assembly 38 to pressure tube 230. This allows pressure tube 230 to be shorter than pressure tube 30. Pressure tube 30 only needs to be long enough to accommodate the full compression movement of piston assembly 32. Third tube ring 282 reduces in diameter in order to mate with a reduced diameter base valve assembly 38. Base valve assembly 38 can be reduced in diameter while still maintaining the same flow passage through base valve assembly 38. In this way, the flow passage between third tube ring 282 and reserve tube 36 can be increased. Third tube ring 282 defines a shoulder 284 which mates with pressure tube 230. Third tube 282 also defines an annular ring 286 that extends from shoulder 284 to be disposed between and mate with pressure tube 230 and intermediate tube 40 to isolate reserve chamber 52 from intermediate chamber 84 and an annular extension 288 which mates with valve body 72 of base valve assembly 38.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber comprising:
   a single piece pressure tube forming a working chamber;
   a piston assembly slidably disposed within the single piece pressure tube, the piston assembly movable in an axial direction and dividing the working chamber into an upper working chamber and a lower working chamber;
   a piston rod attached to said piston assembly;
   a reserve tube disposed around said single piece pressure tube;
   a single piece intermediate tube disposed between the single piece pressure tube and the reserve tube, an intermediate chamber being defined between the intermediate tube and the single piece pressure tube;
   a base valve assembly disposed between the lower working chamber and the reserve chamber;
   a control valve assembly mounted to the reserve tube, the control valve assembly having an inlet in communication with the intermediate chamber and an outlet in communication with the reserve chamber;
   a tube ring directly engaging both the pressure tube and the intermediate tube and not engaging the reserve tube, the tube ring isolating the intermediate chamber from the reserve chamber, the tube ring engaging both the intermediate tube and the pressure tube at a position spaced from the base valve assembly to define a gap in the axial direction between the base valve assembly and both the pressure tube and the intermediate tube, the tube ring being the only component spanning the gap to separate the lower working chamber from the reserve chamber;
   a rod guide assembly engaging each of the single piece pressure tube, the reserve tube and the single piece intermediate tube, both the single piece intermediate tube and the pressure tube extending between the rod guide assembly and the tube ring.

2. The shock absorber according to claim 1, wherein the tube ring engages both the pressure tube and the intermediate tube at a position adjacent the inlet to the control valve assembly and spaced from the base valve assembly.

3. The shock absorber according to claim 2, wherein the tube ring engages an end face of the pressure tube.

4. The shock absorber according to claim 1, wherein the tube ring engages an end face of the pressure tube.

5. The shock absorber according to claim 1, wherein the tube ring engages a terminal end of the intermediate tube.

6. The shock absorber according to claim 5, wherein the tube ring engages both the pressure tube and the intermediate tube at a position adjacent the inlet to the control valve assembly and spaced from the base valve assembly.

7. The shock absorber according to claim 6, wherein the tube ring engages an end face of the pressure tube.

8. The shock absorber according to claim 5, wherein the tube ring engages an end face of the pressure tube.

9. The shock absorber according to claim 1, wherein an outside diameter of the reserve tube at a position between the tube ring and the base valve assembly is smaller than an outside diameter of the reserve tube at a position between the tube ring and the rod guide assembly; and
   the outside diameter of the reserve tube at the position between the tube ring and the base valve assembly being configured to mate with a knuckle of a suspension system.

10. A shock absorber comprising:
    a single piece pressure tube forming a working chamber;
    a piston assembly slidably disposed within the single piece pressure tube, the piston assembly movable in an axial direction and dividing the working chamber into an upper working chamber and a lower working chamber;
    a piston rod attached to said piston assembly;
    a reserve tube disposed around said single piece pressure tube;
    a single piece intermediate tube disposed between the single piece pressure tube and the reserve tube, an intermediate chamber being defined between the intermediate tube and the single piece pressure tube;
    a base valve assembly disposed between the lower working chamber and the reserve chamber;
    a control valve assembly mounted to the reserve tube, the control valve assembly having an inlet in communication with the intermediate chamber and an outlet in communication with the reserve chamber;
    a tube ring disposed between the pressure tube and the intermediate tube, the tube ring isolating the intermediate chamber from the reserve chamber, the tube ring engaging both the intermediate tube and the pressure tube at a position between the inlet to the control valve assembly and the base valve assembly to define a gap in the axial direction between the base valve assembly and both the pressure tube and the intermediate tube, the tube ring being the only component spanning the gap to separate the lower working chamber from the reserve chamber;

a rod guide assembly directly engaging each of the single piece pressure tube, the reserve tube and the single piece intermediate tube, both the single piece intermediate tube and the pressure tube extending between the rod guide assembly and the tube ring.

11. The shock absorber according to claim 10, wherein the tube ring engages an end face of the pressure tube.

12. The shock absorber according to claim 10, wherein the tube ring engages a terminal end of the intermediate tube.

13. The shock absorber according to claim 12, wherein the tube ring engages an end face of the pressure tube.

14. The shock absorber according to claim 10, wherein an outside diameter of the reserve tube at a position between the tube ring and the base valve assembly is smaller than an outside diameter of the reserve tube at a position between the tube ring and the rod guide assembly; and the outside diameter of the reserve tube at the position between the tube ring and the base valve assembly being configured to mate with a knuckle of a suspension system.

* * * * *